P. B. BOSWORTH.
DEMOUNTABLE RIM FOR VEHICLE TIRES.
APPLICATION FILED DEC. 1, 1908.
1,094,052.
Patented Apr. 21, 1914.
2 SHEETS—SHEET 2.
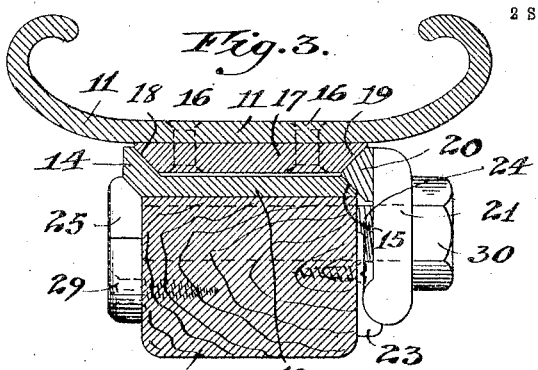
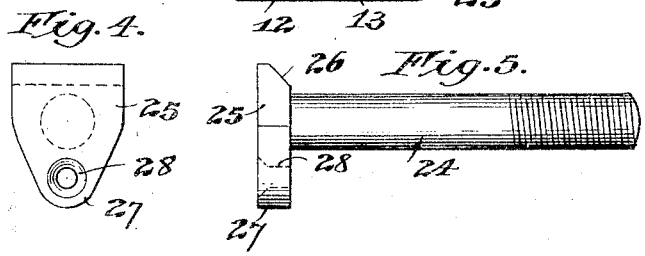
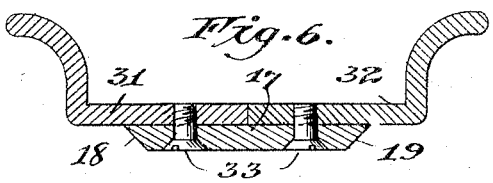
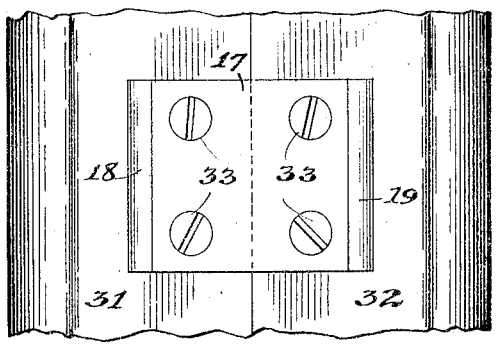
Witnesses,
Inventor,
Perry B. Bosworth
By Offield, Towle, Linthicum
Atty's.

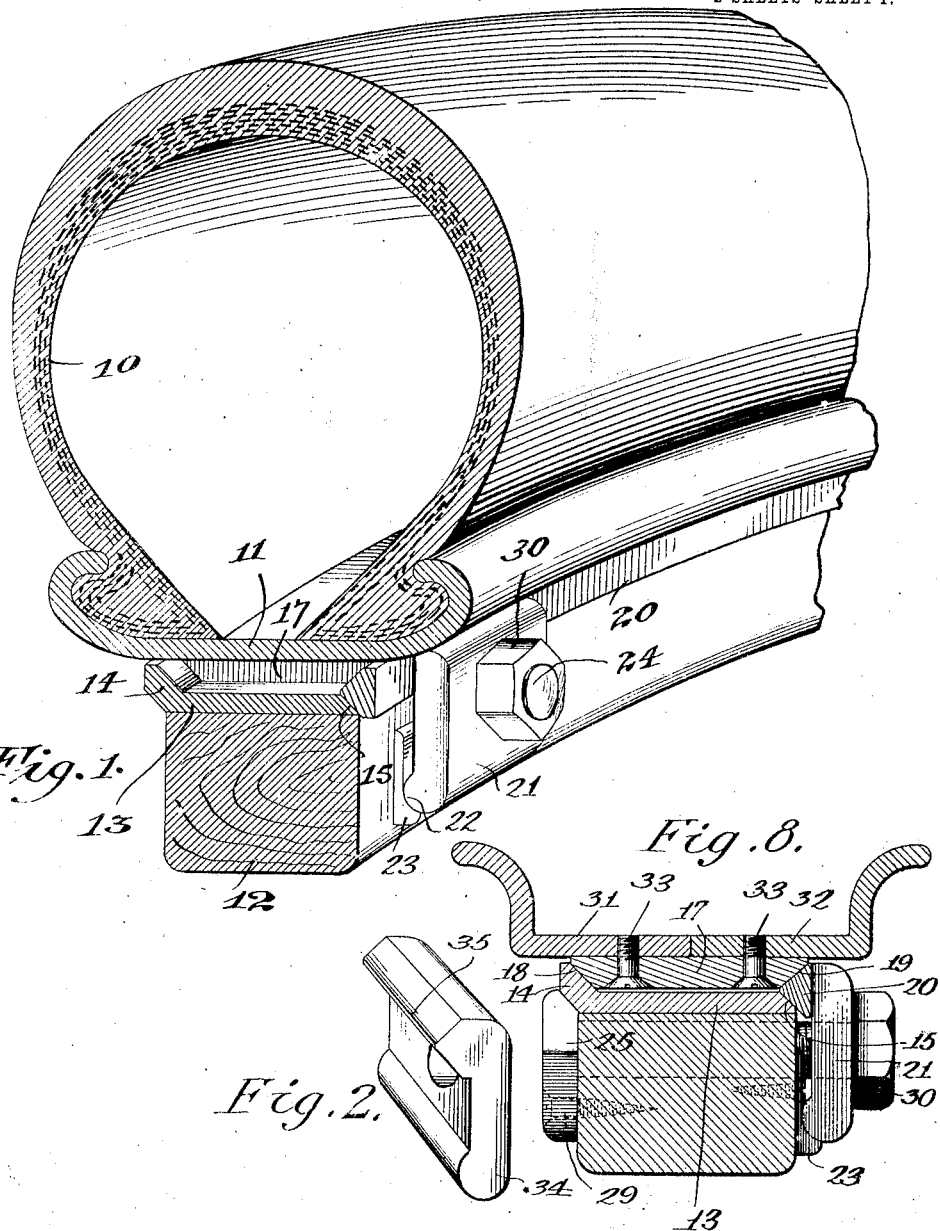

UNITED STATES PATENT OFFICE.

PERCY B. BOSWORTH, OF AKRON, OHIO, ASSIGNOR TO FIRESTONE TIRE & RUBBER COMPANY, OF AKRON, OHIO, A CORPORATION OF WEST VIRGINIA.

DEMOUNTABLE RIM FOR VEHICLE-TIRES.

1,094,052.  Specification of Letters Patent.  Patented Apr. 21, 1914.

Application filed December 1, 1908. Serial No. 465,562.

*To all whom it may concern:*

Be it known that I, PERCY B. BOSWORTH, a citizen of the United States, residing at Akron, in the county of Summit and State of Ohio, have invented certain new and useful Improvements in Demountable Rims for Vehicle-Tires, of which the following is a specification.

This invention relates to the art of vehicle tire fastening devices, and has reference more particularly to improvements in that class or type of fastening devices wherein the tire-body proper is permanently seated in an internal tire-rim, which latter is, in turn, mounted upon and detachably or otherwise secured to the wheel-rim.

In the development of the art of vehicle tire fastenings, many devices for detachably securing the tire proper upon a rim permanently mounted on the wheel so that the tire may be readily removed and replaced without requiring any special tools, have been devised, some of which have gone into extensive use. A somewhat later development of the art has produced a type known as the "demountable rim" tire, which is characterized by the provision of a metal rim that permanently engages the base or inner periphery of the tire and is itself detachably mounted on the wheel-rim. It is to this latter type that my present invention belongs; and among the salient objects of the invention are, to provide a simplified and improved fastening device for securing the tire-rim on the wheel-rim with capacity for quick and easy withdrawal; to provide a fastening means which shall strongly and rigidly secure the tire and its rim on the wheel-rim and prevent any movement of the tire-rim relatively to the wheel-rim; to render the operations of applying and withdrawing the tire and tire-rim from the wheel-rim as simple and expeditious as possible; and, generally, to provide an efficient and inexpensive construction of the demountable rim type.

The invention will be readily understood when considered in connection with the accompanying drawings showing one practical embodiment thereof, in which—

Figure 1 is a perspective elevation, in cross-section at one end, of a wheel-rim and tire equipped with my present improvements. Fig. 2 is a perspective detail of a modified form of clamp designed to combine therewith the chief function of the locking-ring shown in Fig. 1. Fig. 3 is a cross-sectional detail through the parts shown in Fig. 1, with the tire-body omitted, and showing a special form of clamping bolt. Figs. 4 and 5 are, respectively, end and side elevations of the clamping bolt detached. Fig. 6 is a cross-sectional detail illustrating the application of the invention to a longitudinally divided tire-rim. Fig. 7 is a bottom plan view of Fig. 6. Fig. 8 is a view similar to Fig. 3 showing a longitudinally divided tire-rim.

Referring to the drawings, 10 designates the tire-body proper, which is herein shown as of the pneumatic type having a longitudinally split inner periphery, the base of the tire, constituted by the inner marginal portions thereof, being permanently engaged with a metal tire-rim 11 herein shown as of the well known clencher form. It should be understood, however, that the invention is equally applicable to solid tires, as well as to tire-rims of other specific forms.

12 designates the usual felly of a wheel, such as that used on automobiles; and permanently mounted thereon is a metal band 13 constituting what I term the wheel-rim, in distinction to the member 11, which I term the tire-rim. The wheel-rim 13 has on one edge, and preferably formed integral therewith, an outwardly leaning side-flange 14, while its opposite edge is beveled or inclined, as shown at 15.

Secured at intervals to the inner face of the tire-rim 11, as by countersunk rivets 16, are a series of shoes 17, which have oppositely beveled edges 18 and 19, the former of which is adapted, when the tire-rim is in place, to engage the inclined inner wall of the side-flange 14.

20 designates a locking-ring which may be made continuous or in sections, as desired, and which has a double-beveled or V-shaped inner face adapted to engage the inclined edges 15 and 19 of the wheel-rim and shoes, respectively, in the manner clearly shown in Figs. 1 and 3. To secure said locking-ring in operative engagement with the tire-rim and shoes, I employ a series of clamps 21 spaced at intervals around the side of the wheel, each of said clamps being preferably, and as herein shown, formed with a knuckle 22 at its lower end that seats on a bearing-plate 23 secured to the side of the felly 12 in such a manner that its upper end may swing freely toward and from the outer side of the locking-ring. The clamp 21 is secured in place and drawn hard against the outer face of the locking-ring 20 by means of a bolt passing through registering holes in said clamp and the felly. For this purpose a bolt of ordinary construction will serve; but I prefer to employ a bolt such as 24 having a specially formed head 25 that engages the side of the felly opposite that to which the clamp 21 is applied. By reference to Figs. 4 and 5 it will be seen that the head 25 of the bolt has at its upper end a beveled inner edge 26 that directly engages the correspondingly inclined outer wall of the flange 14 of the wheel-rim 13, and thus constitutes an abutment and support for the latter on that side of the felly. Preferably, also, the head of the bolt is extended inwardly, as shown at 27, sufficiently to permit of a countersunk hole 28 being formed therethrough through which an ordinary screw 29 is passed and entered into the felly. The opposite or threaded end of the bolt is equipped with an ordinary nut 30 that, when turned up, engages the outer face of the clamp 21; and the purpose of the screw 29 is to secure the head of the bolt to the side of the felly and thus prevent any tendency of the bolt to slide out of place when the nut 30 is loosened, as in withdrawing the tire.

To assemble the parts, the tire with its demountable rim 11 secured thereto, and with the shoes 17 secured to the inner face of said rim, is applied laterally over the free or non-flanged edge of the wheel-rim 13. The locking-ring 20 is then set in place, the clamps 21 are then applied over the projecting threaded ends of the bolts 24 and seated in their bearings 23 with their free ends lying against the outer face of the locking-ring 20, and the nuts 30 are then applied and turned up tightly. This operation causes the ring 20 to be forced between the oppositely beveled edges 15 and 19 of the wheel-rim and shoes, tending to spread the latter apart, as also to force the opposite beveled edges 18 of the shoes 17 hard against the inner inclined wall of the flange 14. In this way and by this means the tire-rim is strongly and rigidly secured on the wheel-rim against lateral movement relatively to the latter and without requiring the use of bolts or other like mechanical fastenings between the two.

In practice the beveled inner sides of the locking ring are disposed approximately at right angles to each other. It is not the purpose to give to the locking-ring the function of a wedge, such as it might have were the beveled sides disposed at a relatively narrow angle to each other, because, when so formed, the ring would stick objectionably and be difficult of removal. The relative inclination of its beveled sides is such, however, as to have the above-described action, but without producing any wedging effect to the extent of causing it to stick between the wheel-rim and the shoes when the clamping devices have been released.

To remove the tire and its rim, it is necessary only to withdraw the nuts 30 and clamps 21, which permits the removal of the locking-ring 20 and thus leaves the shoes 17 and tire-rim free to slip off the beveled edge of the wheel-rim.

In Figs. 6 and 7 I have shown how the shoes 17 may serve an additional function as a cleat to unite the twin sections 31 and 32 of a longitudinally split rim; the latter being herein shown as having outwardly curved side-flanges instead of being of the clencher type; but so far as the utilization of the shoes 17 as a means for rigidly connecting the twin sections of the rim is concerned, of course the particular character and form of the rim is immaterial. In this construction, the shoe 17 is secured to the rim sections in a manner to be readily removable, as by screws 33.

If preferred, the clamps may be modified in form so as to combine also the function of the locking-ring when located opposite the shoes 17; and in Fig. 2 I have illustrated such a modification in which the upper edge of the clamp 34 is formed with an integral double-beveled lateral extension 35 that directly engages the beveled edges 15 and 19 of the vehicle rim and shoes 17, respectively. In practice, however, I prefer to employ the locking-ring 20 in combination with the clamps 21, since said locking-ring also constitutes a seal or closure preventing the introduction of dirt between the wheel and tire rims.

While I have shown the coöperating inclined faces of the locking-ring and wheel-rim as straight or flat and disposed at right angles, yet it will be evident that the particular angularity or cross-sectional form of the undercut coöperating surfaces is immaterial, so long as the purposes and results of the invention are subserved.

I claim:

1. The combination with a wheel-rim having a flange on one edge, of a demountable tire-rim having a plurality of separated transversely disposed shoes on its inner face engaging said flange at one edge, the adjacent opposite edges of said wheel-rim and shoes being undercut toward each other, a locking member engaging opposed undercut edges of said wheel-rim and shoes, and means for forcing said locking member between said undercut edges comprising a lever, a ledge on which said lever is fulcrumed, and means for applying pressure to the lever, substantially as described.

2. The combination with a wheel-rim having a flange on one edge and beveled on its opposite edge, of a demountable tire-rim having a separately formed shoe on its inner face engaging said flange at one edge and beveled on its opposite edge, means for securing the shoe to the tire rim, a double-beveled member engaging the opposed beveled edges of said wheel-rim and shoe, and means for forcing said double-beveled member between said beveled edges comprising a lever, a ledge on which said lever is fulcrumed, and means for applying pressure to the lever, substantially as described.

3. The combination with a wheel-rim having an outwardly inclined flange on one edge and beveled on its opposite edge, of a demountable tire-rim having on its inner face a shoe formed with beveled side edges one of which engages said flange, a double-beveled member engaging the opposed beveled edges of said wheel-rim and shoe, the engaging surfaces of said member being disposed at approximately right angles to each other to prevent wedging thereof, and securing means for said double-beveled member comprising a lever, a ledge on which said lever is fulcrumed, and means for applying pressure to the lever, substantially as described.

4. The combination with a felly and a wheel-rim thereon having an outwardly inclined flange on one edge and beveled on its opposite edge, of a demountable tire-rim having on its inner face a shoe formed with beveled side edges one of which engages said flange, a double-beveled member engaging the opposed beveled edges of said wheel-rim and shoe, and a lever clamp having at its inner edge a knuckle fulcrumed in a complementary ledge on the side of the felly and at its outer edge overlying the outer side of said double-beveled member, and means for applying pressure to said lever, substantially as described.

5. In a wheel, the combination of a wheel rim having a retaining flange at one edge, a demountable tire rim adapted to fit on said wheel rim and engage said retaining flange, and means for securing the tire rim in place comprising a retaining portion engaging the wheel and tire rims at the edges thereof opposite to the flanged edge of the wheel rim, and a lever clamp coöperatively associated with said retaining member having at its inner edge a portion fitting a complementary ledge on the side of the wheel, substantially as described.

6. The combination of a tire-holding rim, a felly, means secured to said felly and adapted to engage a surface of said rim at one side, ledges on the side of said felly, a plurality of clamping levers fulcrumed on said ledges and means for applying pressure to said levers.

PERCY B. BOSWORTH.

Witnesses:
   Samuel N. Pond,
   Allen W. Moore.